(12) United States Patent
Huck et al.

(10) Patent No.: US 10,531,636 B2
(45) Date of Patent: Jan. 14, 2020

(54) LOW DENSITY COATED ANIMAL LITTER COMPOSITIONS

(71) Applicant: NESTEC SA, Vevey (CH)

(72) Inventors: Nathan Foster Huck, Jackson, MO (US); Phillip B. Greene, St. Louis, MO (US)

(73) Assignee: SOCIÉTÉ DES PRODUITS NESTLÉ S.A., Vevey (CH)

( * ) Notice: Subject to any disclaimer, the term of this patent is extended or adjusted under 35 U.S.C. 154(b) by 0 days.

(21) Appl. No.: 15/946,221

(22) Filed: Apr. 5, 2018

(65) Prior Publication Data

US 2018/0220618 A1 Aug. 9, 2018

Related U.S. Application Data

(62) Division of application No. 14/138,288, filed on Dec. 23, 2013, now Pat. No. 9,986,714.

(60) Provisional application No. 61/746,017, filed on Dec. 26, 2012.

(51) Int. Cl.
*A01K 1/01* (2006.01)
*A01K 1/015* (2006.01)

(52) U.S. Cl.
CPC .............. *A01K 1/01* (2013.01); *A01K 1/0154* (2013.01)

(58) Field of Classification Search
CPC ....................................................... A01K 1/01
See application file for complete search history.

(56) References Cited

U.S. PATENT DOCUMENTS

| | | |
|---|---|---|
| 5,152,250 A | 10/1992 | Loeb |
| 5,193,489 A | 3/1993 | Hardin |
| 5,303,676 A | 4/1994 | Lawson |
| 5,359,961 A | 11/1994 | Goss et al. |
| 5,421,291 A | 6/1995 | Lawson et al. |
| 5,526,770 A | 6/1996 | Kiebke |
| 5,609,123 A | 3/1997 | Luke et al. |
| 5,634,431 A | 6/1997 | Reddy et al. |
| 5,638,770 A | 6/1997 | Peleties |
| 5,655,480 A | 8/1997 | Steckel |
| 5,664,523 A | 9/1997 | Ochi et al. |
| 5,724,915 A | 3/1998 | Ochi et al. |
| 5,826,543 A | 10/1998 | Raymond et al. |
| 5,836,263 A | 11/1998 | Goss et al. |
| 5,927,049 A | 7/1999 | Simard |
| 5,960,743 A | 10/1999 | Taylor |
| 5,961,968 A | 10/1999 | Moore, Jr. |
| 5,992,351 A | 11/1999 | Jenkins |

(Continued)

FOREIGN PATENT DOCUMENTS

| | | |
|---|---|---|
| AU | 2005202838 A1 | 1/2006 |
| CN | 1200013 A | 11/1998 |

(Continued)

OTHER PUBLICATIONS

International Search Report and Written Opinion received for PCT Application No. PCT/IB2016/095005, dated Feb. 21, 2017, 12 pages.

(Continued)

*Primary Examiner* — Monica L Williams

(57) ABSTRACT

Animal litter compositions having relatively low densities are described herein. Methods of manufacturing such litter compositions are also described.

3 Claims, 1 Drawing Sheet

(56) References Cited

U.S. PATENT DOCUMENTS

| | | |
|---|---|---|
| 6,014,947 A | 1/2000 | Sladek et al. |
| 6,053,125 A | 4/2000 | Kory et al. |
| 6,089,190 A | 7/2000 | Jaffee et al. |
| 6,101,978 A | 8/2000 | Steckel |
| 6,276,300 B1 | 8/2001 | Lewis, II et al. |
| 6,287,550 B1 | 9/2001 | Trinh et al. |
| 6,308,658 B1 | 10/2001 | Steckel |
| 6,346,240 B1 | 2/2002 | Moore, Jr. |
| 6,568,349 B1 | 5/2003 | Hughes et al. |
| 6,657,098 B1 | 12/2003 | Niki et al. |
| 6,745,720 B2 | 6/2004 | Rasner et al. |
| 6,868,802 B2 | 3/2005 | McPherson et al. |
| 7,011,824 B2 | 3/2006 | Moore, Jr. |
| 7,041,279 B1 | 5/2006 | Ali et al. |
| 7,316,201 B2 | 1/2008 | Rasner et al. |
| 7,343,874 B2 | 3/2008 | DeLeeuw et al. |
| 7,429,421 B2 | 9/2008 | Greene et al. |
| 7,467,600 B2 | 12/2008 | Ikegami et al. |
| 7,595,429 B2 | 9/2009 | Hursey |
| 7,603,964 B2 | 10/2009 | Jenkins et al. |
| 7,665,418 B2 | 2/2010 | Bracilovic |
| 7,753,002 B2 | 7/2010 | Wang et al. |
| 8,074,604 B2 | 12/2011 | Swank |
| 8,096,267 B2 | 1/2012 | Greene et al. |
| 8,232,401 B2 | 7/2012 | Satoh et al. |
| 8,252,344 B2 | 8/2012 | Hursey |
| 8,268,018 B2 | 9/2012 | Privitera et al. |
| 8,383,819 B2 | 2/2013 | Matsuda et al. |
| 8,429,849 B2 | 4/2013 | Bertin et al. |
| 8,453,604 B2 | 6/2013 | Matsuo et al. |
| 8,490,578 B2 | 7/2013 | Hughes |
| 8,955,294 B2 | 2/2015 | Free et al. |
| 2003/0148100 A1 | 8/2003 | Greene et al. |
| 2005/0005869 A1* | 1/2005 | Fritter ............ A01K 1/0152 119/173 |
| 2005/0005870 A1 | 1/2005 | Fritter et al. |
| 2005/0056229 A1 | 3/2005 | Greene et al. |
| 2005/0175577 A1* | 8/2005 | Jenkins ............ A01K 1/0152 424/76.1 |
| 2006/0065200 A1 | 3/2006 | Jenkins |
| 2006/0243212 A1 | 11/2006 | Jenkins et al. |
| 2008/0223302 A1 | 9/2008 | Wang et al. |
| 2010/0107931 A1 | 5/2010 | Roulston |
| 2011/0174228 A1 | 7/2011 | Liu |
| 2012/0118242 A1 | 5/2012 | Cheeseman et al. |
| 2014/0174370 A1 | 6/2014 | Huck et al. |
| 2015/0208606 A1* | 7/2015 | Raper ............ A01K 1/0152 119/171 |

FOREIGN PATENT DOCUMENTS

| | | |
|---|---|---|
| CN | 1505472 A | 6/2004 |
| DE | 2318495 A1 | 10/1973 |
| DE | 4312279 A1 | 10/1994 |
| DE | 4427334 A1 | 2/1996 |
| EP | 1353548 B1 | 10/2005 |
| EP | 1139726 B1 | 4/2006 |
| GB | 2318495 A | 4/1998 |
| JP | H110225633 A | 8/1998 |
| JP | 2003019190 A | 1/2003 |
| JP | 2003116389 A | 4/2003 |
| JP | 2004514438 A | 5/2004 |
| JP | 2004287626 A | 10/2004 |
| JP | 2005516597 A | 6/2005 |
| JP | 4175726 B2 | 11/2008 |
| JP | 2011032607 A | 2/2011 |
| JP | 4649707 B2 | 3/2011 |
| JP | 5183166 B2 | 4/2013 |
| KR | 1998083194 A | 2/2005 |
| RU | 2127041 C1 | 3/1999 |
| RU | 2158078 C1 | 10/2000 |
| RU | 2283585 C2 | 9/2006 |
| WO | 0150843 A2 | 7/2001 |
| ZA | 201107861 B | 7/2012 |

OTHER PUBLICATIONS

International Search Report and Written Opinion received for PCT Application No. PCT/IB2016/095006, dated Feb. 21, 2017, 12 pages.

International Search Report and Written Opinion received for PCT Application No. PCT/US2013/077396, dated Mar. 17, 2014, 9 pages.

* cited by examiner

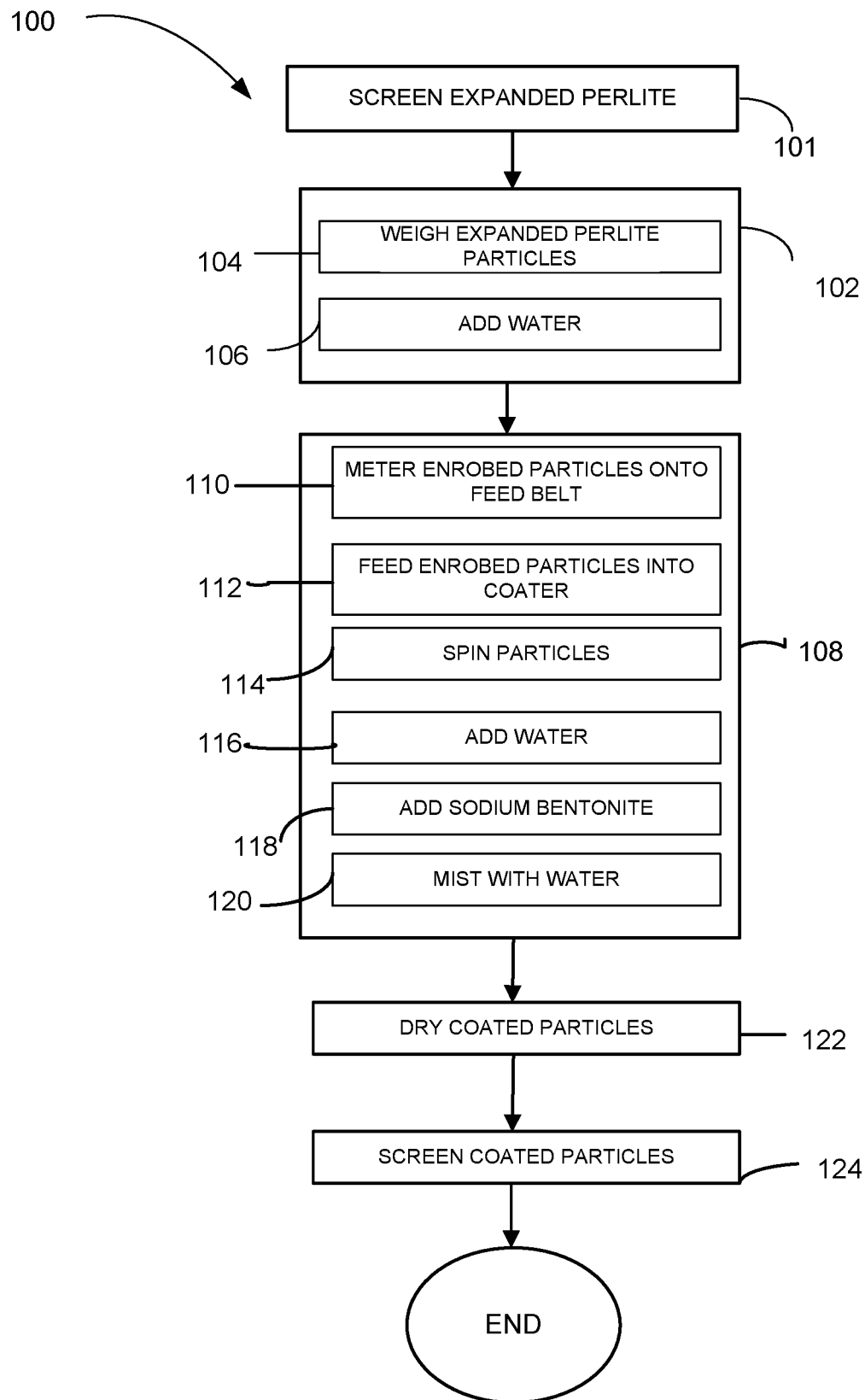

LOW DENSITY COATED ANIMAL LITTER COMPOSITIONS

CROSS REFERENCE TO RELATED APPLICATIONS

This application is a divisional of U.S. application Ser. No. 14/138,288 filed Dec. 23, 2013, which claims the benefit of U.S. Provisional Patent Application Ser. No. 61/746,017, filed Dec. 26, 2012, the entire contents of which are incorporated herein by reference.

FIELD OF THE DISCLOSURE

The present invention generally relates to animal litter compositions and methods of producing animal litter compositions.

RELATED APPLICATIONS

This application claims the benefit of U.S. Provisional Patent Application Ser. No. 61/746,017, filed Dec. 26, 2012, the entire contents of which are incorporated herein by reference.

BACKGROUND

A clumping animal litter, as known in the industry, is a litter product in which particles clump upon contact with a liquid such as urine. Clumping litter is desirable because it allows the consumer to separate and remove urine-soaked litter granules and provides a cost savings to the consumer because the entire litter does not have to be replaced.

Traditional litters, including clumping litters, often include relatively bulky, dense materials and thus packaged products are heavy and can be difficult for consumers to manage.

SUMMARY OF THE DISCLOSURE

Among the various aspects of the present disclosure is the provision of an animal litter composition having a relatively low density (and thus lightweight), among other beneficial properties.

Briefly, therefore, the present disclosure is directed to an animal litter composition comprising (i) a non-agglomerated particle comprising a perlite; and (ii) a coating on an outer surface of the particle, the coating comprising a clumping agent. In a particular embodiment, the clumping agent comprises bentonite.

Another aspect of the present disclosure is directed to animal litter composition comprising (i) a particle consisting essentially of expanded perlite; and (ii) a coating on an outer surface of the particle, the coating comprising a clumping agent. In a particular embodiment, the clumping agent comprises bentonite.

Another aspect of the present disclosure is directed to methods of manufacturing animal litters. One method involves (i) feeding perlite particles having a bulk density in the range of 25-200 kg/m$^3$ into a coater; (ii) adding a liquid to the coater to create wet perlite particles; and (iii) feeding bentonite having a size range of about 100 mesh to about 300 mesh into the coater to coat the wet perlite particles.

Other objects and features will be in part apparent and in part pointed out hereinafter.

BRIEF DESCRIPTION OF THE DRAWINGS

FIG. 1 shows a method of manufacturing a coated litter of the disclosure.

DETAILED DESCRIPTION

It must be noted that, as used in this specification and the appended claims, the singular forms "a," "an" and "the" include plural referents unless the content clearly dictates otherwise.

Unless defined otherwise, all technical and scientific terms used herein have the same meaning as commonly understood by one of ordinary skill in the art to which the disclosure pertains. Although a number of methods and materials similar or equivalent to those described herein can be used in the practice of the present disclosure, the preferred materials and methods are described herein.

All numbers expressing quantities of ingredients, constituents, reaction conditions, and so forth used in the specification and claims are to be understood as being modified in all instances by the term "about." Notwithstanding that the numerical ranges and parameters setting forth the broad scope of the subject matter presented herein are approximations, the numerical values set forth in the specific examples are reported as precisely as possible. All numerical values, however, inherently contain certain errors necessarily resulting from the standard deviation found in their respective testing measurements.

The term "mesh," "U.S. sieve" or "Mesh U.S. Sieve Series" as used herein and in the appended claims is defined by ASTM E-11 U.S.A. Standard testing Seives.

Formulations of low density coated animal litter and methods for producing low density coated animal litter are described. In the following description, for purposes of explanation, numerous specific details are set forth in order to provide a thorough understanding of various exemplary embodiments. It will be evident, however, to one of ordinary skill in the art that embodiments of the invention may be practiced without these specific details.

Litter Compostions

The litter compositions of the present disclosure include perlite particles coated with a clumping agent. In one particular embodiment, the particles are non-agglomerated particles comprising a perlite. In another particular embodiment, the particles consist essentially of expanded perlite. In yet another particular embodiment, granules of litter include an expanded perlite core coated with a mixture of sodium bentonite powder and guar gum.

Perlite is a generic term for a naturally occurring siliceous rock. One feature which sets perlite apart from other volcanic glasses is that when heated to a suitable point in its softening range, it expands from four to twenty times its original volume. This expansion is due, at least in part, to the presence of two to six percent combined water in the crude perlite rock. Firing, i.e., quickly heating to above 1600° F. (871° C.), causes the crude rock to pop in a manner similar to popcorn yielding a very open, highly porous structure referred to as expanded perlite.

Where expanded perlite is employed in the litter compositions, the bulk density of expanded perlite is typically in the range of 25 to 200 kg/m$^3$. In one embodiment, for example, the bulk density of the expanded perlite of a coated litter of the invention is in the range of 55 to 80 kg/m$^3$ (e.g., 55 kg/m$^3$, 56 kg/m$^3$, 58 kg/m$^3$, 60 kg/m$^3$, 62 kg/m$^3$, 64 kg/m$^3$, 66 kg/m$^3$, 68 kg/m$^3$, 70 kg/m$^3$, 72 kg/m$^3$, 74 kg/m$^3$, 76 kg/m$^3$, 78 kg/m$^3$, or 80 kg/m$^3$). In another embodiment, for example, the bulk density of the expanded perlite is in the range of 55 to 96 kg/m³ (e.g., 55 kg/m³, 56 kg/m³, 58 kg/m³, 60 kg/m³, 62 kg/m³, 64 kg/m³, 66 kg/m³, 68 kg/m³, 70 kg/m³, 72 kg/m³, 74 kg/m³, 76 kg/m³, 78 kg/m³ 80 kg/m³, 82 kg/m³, 84 kg/m³, 86 kg/m³, 88 kg/m³, or 90 kg/m³. In one particular embodiment, for example, the bulk density of the expanded perlite is approximately 72 kg/m³. In other particular embodiments, for example, the bulk density of the expanded perlite is approximately 84 kg/m³ or approximately 88 kg/m³.

Perlite can be further defined by its particle size. A range of particle sizes is preferred for the low density coated litters described herein, in one embodiment, the particle size of expanded perlite is in the range of U.S. sieve 8 to U.S. sieve 30. In another embodiment, the particle size of expanded perlite is in the range of U.S. sieve 6 to U.S. sieve 40. Preferably, the expanded perlite particles are not evenly distributed within the size range.

While typically at least some moisture is present in order to facilitate with the coating process, the moisture content of the litter material described herein is relatively low. In one embodiment, for example, the moisture content (expressed as a percentage by weight) of the expanded perlite of the low density coated litter is between approximately 0% and 3%. In another embodiment, for example, the moisture content (expressed as a percentage by weight) is between approximately 2% and 3%. In yet another embodiment, the moisture content (expressed as a percentage by weight) is approximately 0.5%.

In some embodiments, the absorption of the expanded perlite particles is measured wt/wt from about 100% to about 800%, and measured by volume, is at least 20%. In one embodiment, the absorption of the expanded perlite particles, measured wt/wt is approximately 600% and, measured by volume, is approximately 45%.

The core perlite materials are coated with a clumping agent; i.e., an agent when wetted results in the binding of adjacent particles. Representative clumping agents include, for example, bentonite (such as sodium bentonite), guar gums, starches, xanthan gums, gum Arabic, gum acacia, silica gel, and other minerals, and mixtures a mixture thereof. In one embodiment, the clumping agent comprises bentonite.

In one preferred embodiment, the clumping agent comprises sodium bentonite. Sodium bentonite is described in the industry as a "swelling" clay because particles of sodium bentonite enlarge in size and volume when they absorb moisture. In addition, sodium bentonite particles exhibit gel-like qualities when wet that promote clumping of the sodium bentonite particles when liquid (such as urine) is applied. In another embodiment, the clumping agent comprises a mixture of sodium bentonite and guar gum.

Where sodium bentonite is employed as or in the clumping agent, the bulk density of the bentonite is typically in the range of 600 to 1125 kg/m³ (e.g., 600 kg/m³, 700 kg/m³, 800 kg/m³, 900 kg/m³, 1000 kg/m³, or 1100 kg/m³). In one particular embodiment, for example, the bulk density of the sodium bentonite is approximately 1125 kg/m³ (approximately 70 lb/ft³).

In one embodiment, the moisture percentage of the sodium bentonite of the low density litter is between about 6% and 7% (e.g., 6.1%, 6.2%, 6.3%, 6.4%, 6.5%, 6.6%, 6.7%, 6.8%, or 6.9%). In a particular embodiment, the moisture percentage of the sodium bentonite is approximately 6.24%.

The bentonite of the low density coated litter is preferably provided as a powder or "fines" with a size range of 100 to 300 mesh. In an exemplary embodiment, sodium bentonite particles are employed at approximately 200 mesh.

Methods of Preparing Litter Compositions

In general, methods for preparing litter compositions in accordance with the disclosure involve coating a perlite (and/or an expanded perlite) with a clumping agent. In the embodiment illustrated in FIG. 1, for example, low density clumping litter is produced by a method 100 employing one or more of the following steps.

In step 101, perlite is screened to eliminate particles smaller than the range of particle sizes selected for the particular embodiment of litter. For example, expanded perlite may be screened to eliminate particles smaller than 50 U.S. sieve, more preferably smaller than approximately 40 U.S. sieve, still more preferably smaller than approximately 30 U.S. sieve. Commercially available shaker screens may be utilized.

At optional step 102, perlite particles are placed in an enrobing machine to agitate the particles. This assists in the reduction of fines which, in turn, aids in dust abatement. In an exemplary embodiment, expanded perlite particles are weighed at step 104 before or as they enter the enrober and the particles are sprayed with water 106. The amount of water added generally depends upon the weight of the expanded perlite particles included in the enrober. In one embodiment, for example, the weight of water added is between approximately 5 and 35 percent of the weight of the expanded perlite particles (e.g., 5%, 10%, 15%, 20%, 25%, 30, or 35%). In another embodiment, for example, the weight of water added is between approximately 10 percent and 20 percent of the weight of the expanded perlite particles (e.g., 10%, 12%, 14%, 16%, 18%, or 20%). In one particular embodiment, for example, the weight of water added is approximately 14 percent of the weight of the expanded perlite particles. Enrobing may also promote gelling of the bentonite coating material, as further described below.

In an alternative embodiment, water may be added at step 106 in a quantity appropriate to achieve a particular target moisture content following enrobing. In one embodiment, water is added in a quantity appropriate to achieve a target moisture content of approximately 5% to 30% (e.g., 5%, 10%, 15%, 20%, 25%, 30, or 35%). In another embodiment, water is added in a quantity appropriate to achieve a target moisture content of approximately 12% to 16% (e.g., 13%, 14%, or 15%).

At step 108, perlite particles are coated with the clumping agent (e.g., sodium bentonite) in a coater. By way of example, centrifugal coating methods can be employed. For instance, a batch of perlite particles are metered onto a feed belt by volume 110 and fed into the coater as it rotates 112. Perlite particles roll inside the chamber of the coater in the direction of rotation. In an optional preconditioning step 114, the perlite particles are spun in the coater for a period of time (e.g., 30 to 60 seconds) prior to coating.

At step 116, water is added to the coater while the coater is spinning. Water added in step 116 may be added based on the weight of the clumping agent to be added in the coater. The weight of water added is typically between approximately 10 to 100 percent of the weight of the clumping agent (e.g., 10%, 15%, 20%, 25%, 30% 35%, 40%, 45%, 50%, 55%, 60%, 65%, 70%, 75%, 80%, 85%, 90%, 95%, or 100%). In one embodiment, for example, the weight of water added is between approximately 25 to 75 percent of the weight of the clumping agent (e.g., 25%, 30%, 35%, 40%, 45%, 50% 55%, 60%, 65%, 70%, or 75%). In another embodiment, for example, the weight of water added is between approximately 30 to 60 percent of the weight of the clumping agent (e.g., 30%, 35%, 40%, 45%, 50%, 55%, or 60%). In the alternative, water addition may occur in the enrober or in both the enrober and the coater.

At step 118, the clumping agent (e.g., sodium bentonite) is metered into the coater. In general, the quantity of clumping agent added into the coater is based on the volume of perlite particles. In one embodiment, for example, between 5 and 25 pounds of sodium bentonite are added per cubic foot of expanded perlite (e.g., 5 pounds, 10 pounds, 12 pounds, 14 pounds, 16 pounds, 18 pounds, 20 pounds, 22 pounds, or 24 pounds). In another embodiment, for example, between 13 and 22 pounds of sodium bentonite are added per cubic foot of expanded perlite (e.g., 14 pounds, 16 pounds, 18 pounds, 20 pounds, or 22 pounds). In yet another embodiment, between 14 and 16 pounds of sodium bentonite are added per cubic foot of expanded perlite (e.g., 14.25 pounds, 14.5 pounds, 14.75 pounds, 15 pounds, 15.25 pounds, 15.5 pounds, 15.75 pounds, or 16 pounds. In one particular embodiment, approximately 15.75 pounds of sodium bentonite are added per cubic foot of expanded perlite.

Other coating materials, such as guar gum, may be included in the coater in addition to or in lieu of a bentonite-based clumping agent. Such materials may be added as a mixture, along with the bentonite, or they may be added in a separate step.

As the bentonite (or other coating material) is metered into the chamber of the coater, it combines with the wet, spinning expanded perlite and forms a coating on the expanded perlite.

At optional step 120, the coated perlite (e.g., expanded perlite) particles are contacted (e.g., misted or sprayed) with water. In general, water added in step 120 is added based on the weight of the clumping agent in the coater. In an exemplary embodiment, the weight of water added is between approximately 5 and 15 percent of the weight of the clumping agent (e.g., 5%, 6%, 7%, 8%, 9%, 10%, 11%, 12%, 13%, 14%, or 15%). In another exemplary embodiment, the weight of water added is between approximately 5 and 10 percent of the weight of the clumping agent (e.g., 5%, 6%, 7%, 8%, 9%, or 10%). In a further exemplary embodiment, the weight of water added is between approximately 6 and 10 percent of the weight of the clumping agent (e.g., 6%, 7%, 8%, 9%, or 10%). In one particular embodiment, the weight of water added is approximately 7 percent of the weight of the clumping agent. In another particular embodiment, the weight of water added is approximately 8 percent of the weight of the clumping agent. In another particular embodiment, the weight of water added is approximately 9 percent of the weight of the clumping agent.

In an alternative embodiment, water may be added at steps 116 and 120 in a quantity appropriate to achieve a particular target moisture content following coating. In one embodiment, for example, water is added in a quantity appropriate to achieve a target moisture content between approximately 20 and 40 percent (e.g., 20%, 21%, 22%, 23%, 24%, 25%, 26%, 27%, 28%, 29%, 30%, 31%, 32%, 33%, 34%, 35%, 36%, 37%, 38%, 39%, or 40%). In another embodiment, for example, water is added in a quantity appropriate to achieve a target moisture content between approximately 25 and 30 percent.

In one embodiment, a rotary system is utilized, where expanded perlite particles, bentonite, and water are tumbled in a drum.

At step 122, the coated particles are transferred to a dryer. Drying removes moisture from the coated particle without substantially removing the coating or substantially damaging the finished product. A fluidized bed dryer is utilized in certain embodiments. Typically, the coated particles are dried to have a moisture content ranging from about 1.5% to about 20%. In one embodiment, for example, the coated particles are dried to a moisture content ranging from about 5% to about 15% (e.g., about 5%, about 7%, about 9%, about 11%, about 13%, or about 15%). In another embodiment, for example, the coated particles are dried to a moisture content ranging from about 7% to about 10% (e.g., about 7%, about 8%, about 9%, or about 10%). In one particular embodiment, for example, the final moisture content of the coated litter product is approximately 10%. In another particular embodiment, the coated particles are dried to a moisture level sufficient to achieve a relatively uniform appearance of the coated particles.

At step 124, another screening process takes place. A vibratory screener may be used to remove coated expanded perlite particles larger than a mesh size of about 8, and smaller than a mesh size of about 40. Any excess coated expanded perlite separated in the screening process may be, for example, ground and added to other litter products or used in other odor or moisture control products.

Various additives may be optionally applied to the coated litter product. Additives may include, for instance, an odor control agent(s), a fragrance(s), an anti-microbial agent(s), an anti-sticking agent(s), an agent(s) for controlling pH, a powder(s) for coloring, dyes, a coloring agent(s) and/or colored particles, a de-dusting agent(s), a disinfectant(s), or combinations thereof. In one embodiment, for example, at least a portion of the coated particles are further coated with a colorant.

Various characteristics of coated litter products of the invention represent significant improvements over existing litter products.

By way of example, the density of coated litter composition of the disclosure is relatively low, compared to other litter products. Typically, for example, the density of the coated litter product is between 200 and 600 kg/m$^3$. In one embodiment, the density of the coated litter product is between 300 and 500 kg/m$^3$ (e.g., 300 kg/m$^3$, 350 kg/m$^3$, 400 kg/m$^3$, 450 kg/m$^3$, or 500 kg/m$^3$). In another embodiment, the density of the coated litter product is between 350 and 450 kg/m$^3$ (e.g., 350 kg/m$^3$, 400 kg/m$^3$, 450 kg/m$^3$). In one particular embodiment, the density of the coated litter product is approximately 350 kg/m$^3$. In another particular embodiment, the density of the coated litter product is approximately 400 kg/m$^3$. In another particular embodiment, the density of the coated litter product is approximately 450 kg/m$^3$. Use of expanded perlite, for example, which is naturally lightweight, that is not agglomerated, crushed, extruded, or otherwise altered in a manner that increases its density, contributes to the desirable low density of the coated litter products of the invention and offers significant improvements over prior art litters. In one preferred embodiment, the perlite material is a non-agglomerated material; that is, it is not agglomerated or otherwise gathered into a mass or clustered with any other material.

In general, the perlite particles are substantially coated with the clumping agent. In one embodiment, for example, the particles are more than 75% coated. In other embodiments, for example, the particles are more than 85%, more than 95%, or more than 99% coated. Preferably, the coating material wholly surrounds or enrobes the particles.

Clumping litter consisting primarily of small, fine particles produces thin, large clumps when exposed to liquid, such as animal urine. On the other hand, clumping litter consisting primarily of larger particles produces columns of clumped litter. A range of various particle sizes produces a somewhat tortuous path for urine (or other liquid). The clumping litter material of the present disclosure includes, in various embodiments, perlite and/or expanded perlite particles that have a particular size distribution, as discussed herein. Accordingly, because the perlite particles used to produce the coated litter product of the invention are not agglomerated, crushed, extruded, or otherwise materially altered (other than to receive a coating), the end product retains the benefits of the size distribution.

EXAMPLES

The following non-limiting examples are provided to further illustrate the present invention. It should be appreciated by those of skill in the art that the techniques disclosed in the examples that follow represent approaches the inventors have found function well in the practice of the invention, and thus can be considered to constitute examples of modes for its practice. However, those of skill in the art should, in light of the present disclosure, appreciate that many changes can be made in the specific embodiments that are disclosed and still obtain a like or similar result without departing from the spirit and scope of the invention.

Examples 1-7

Litter Formation #1

1. Expanded Perlite (1.0 lb) was added to a spinning (275 RPM), batch-type agricultural seed coater (Cimbria Heid, Centri Coater CC10).
2. Water was added (0.3 lb) to the liquid addition port on the coater. The central spinning disc distributed the liquid evenly throughout the perlite aggregate. Approximate addition time was 10 seconds.
3. After water addition, Sodium Bentonite (3.0 lbs) was added to the coater over a 30 second time period.
4. Next, the material was allowed to continue to spin for 10 seconds.
5. The discharge port was opened on the coater, and the discharged material collected.
6. Finally, the material was dried using a lab-scale fluid bed dryer(Carrier) and the final moisture recorded. Steps 1-6 were repeated for Examples 2-7 using the ingredient portions listed. For Examples 2, 4, and 5 the guar was blended with the Bentonite.

Example 8

Litter Formation #2

1. Expanded Perlite (1.0 lb) was added to a spinning (275 RPM), batch-type agricultural seed coater (Cimbria Heid, Centri Coater CC10).
2. Water was added (1.0 lb) using spray nozzles installed inside the coater. Approximate addition time was 10 seconds.
3. After water addition, Sodium Bentonite (3.0 lbs) was added to the coater over a 30 second time period.
4. Immediately after the Bentonite addition, (0.11 lbs) of air atomized water (mist) was applied. Approximate addition time was 5 seconds.
5. Next, the material was allowed to continue to spin for 5 seconds.

6. The discharge port was opened on the coater, and the discharged material collected.
7. Finally, the material was dried using a lab-scale fluid bed dryer(Carrier) and the final moisture recorded.

Examples 9-12

Litter Formation #3

1. Expanded Perlite was passed through a continuous enrober where sufficient water was applied to bring its moisture content up to 8% by mass.
2. The wet enrobed Expanded Perlite was then screened, and the −8/+30 fraction retained.
3. Next, 1 ft$^3$ of the retained −8/+30 fraction was added to a spinning batch-type agricultural seed coater. (Cimbria Heid).
4. Water was added (3.82 lbs) using spray nozzles installed inside the coater. Approximate addition time was 10 seconds.
5. After water addition, Sodium Bentonite (11.95 lbs) was added to the coater over a 30 second time period.
6. Immediately after the Bentonite addition, (0.42 lbs) of air atomized water (mist) was applied. Approximate addition time was 5 seconds.
7. Next, the material was allowed to continue to spin for 5 seconds.
8. The discharge port was opened on the coater, and the discharged material collected.
9. Finally, the material was dried using a fluid bed dryer (Carrier) and the final moisture recorded.
10. Steps 1-9 above were repeated for Examples 10-12 using the listed ingredient proportions. Expanded perlite was enrobed to moistures listed.

Example 13

Litter Formation #4

1. Expanded perlite was misted with water while being conveyed from bulk sack to a batch coater. Upon reaching the batch coater, the Expanded Perlite moisture content was approximately 14% by mass.
2. Approximately (4 ft$^3$) or (23.62 lb) of the Expanded Perlite from Step 1 was added to a spinning batch-type agricultural seed coater. (Cimbria Heid).
3. Water was added (22.34 lbs) using spray nozzles installed inside the coater. Approximate addition time was 12 seconds.
4. After water addition, Sodium Bentonite (64 lbs) was added to the coater over a 30 second time period.
5. Immediately after the Bentonite addition, (2.08 lbs) of air atomized water (mist) was applied. Approximate addition time was 6.5 seconds.
6. Next, the material was allowed to continue to spin for 5 seconds.
7. The discharge port was opened on the coater, and the discharged material collected.
8. Finally, the material was dried using a fluid bed dryer (Carrier) and the final moisture recorded.

Example 14

Bulk Density Measurement

The bulk density of Examples 1-13 was measured using a Seedburo® filling hopper (1¼ in diameter opening), stand, and pint sized (550.06 cm$^3$ dry volume) sample cup according to the procedure below:

1. The litter was poured into the filling hopper until it was full.
2. Next, the empty pint cup was placed on a balance and the balance was zeroed.
3. The cup was then placed beneath the filling hopper. The distance between the filling hopper discharge, and the top edge of the cup was set at 2 inches.
4. The filling hopper discharge slide was then opened to allow product to fall into the empty sample cup. Litter was allowed to flow until the cup was full, and then for an additional 1 to 2 seconds of overflow.
5. A straight edge was then used to remove excess product from the top of the cup; leveling the cup contents with the rim of the cup.
6. The cup with litter was then returned to the balance and the weight of the litter recorded.
7. Steps 1-6 were repeated three times.
8. Mass value was converted to pounds per cubic foot ($lb/ft^3$) using the conversion factor 1 gram per cubic centimeter ($gm/cm^3$) equals 62.4269 $lb/ft^3$. (1 gram per dry pint (g/dry-pt) equals 0.113358 $lb/ft^3$).
9. The average Bulk Density was calculated and is shown in Table 1. Referring to the table, it is clear that the Examples of the invention were significantly less dense than a conventional clay scooping litter (CCSL).

5. At the end of the desired time interval (15 min or 24 hr), the clump was removed from the litter, and it's mass recorded as W1.
6. The clump was then centered on the trap door mechanism assembled in step 2.
7. Next the lever was actuated to release the trap door, allowing the clump to fall onto the ¾" test sieve.
8. The clump was carefully removed from the screen in a manner which allowed loose material to fall free of the clump, but not in a manner which caused additional damage to the clump. (If the clump broke into pieces, largest piece retained on the ¾" screen was selected. If nothing is retained on the screen, the result is zero (0) weight).
9. The clump or largest piece was weighed and the mass recorded as W2.
10. The Percentage of Cohesion value was calculated using the following formula:
Percentage of Cohesion is equal to:

$$[W2(\text{final weight})/W1(\text{initial weight})] \times 100$$

11. The Percentage of Cohesion values for all clumps were averaged and the results are illustrated in Table 2. Referring to the table, it is clear that the Examples formed clumps when encountering the applied liquid, and that

TABLE 1

| | Bulk Density | | | | | | | |
|---|---|---|---|---|---|---|---|---|
| | Replicate | | | | | | | Density Reduction |
| | #1 | | #2 | | #3 | | Average | Relative to |
| Sample | g/Dry Pint | lb/ft³ | g/Dry Pint | lb/ft³ | g/Dry Pint | lb/ft³ | lb/ft³ | CCSL |
| Example 01 | 133.10 | 15.09 | 128.00 | 14.51 | 136.20 | 15.44 | 15.01 | 73.50% |
| Example 02 | 55.20 | 6.26 | 59.10 | 6.70 | 48.00 | 5.44 | 6.13 | 89.18% |
| Example 03 | 217.50 | 24.66 | 216.00 | 24.49 | 220.60 | 25.01 | 24.72 | 56.38% |
| Example 04 | 262.20 | 29.72 | 281.40 | 31.90 | 265.20 | 30.06 | 30.56 | 46.06% |
| Example 05 | 187.60 | 21.27 | 173.10 | 19.62 | 176.40 | 20.00 | 20.29 | 64.18% |
| Example 06 | 280.00 | 31.74 | 270.40 | 30.65 | 282.70 | 32.05 | 31.48 | 44.44% |
| Example 07 | 230.50 | 26.13 | 234.20 | 26.55 | 249.40 | 28.27 | 26.98 | 52.38% |
| Example 08 | 200.20 | 22.69 | 204.10 | 23.14 | 202.60 | 22.97 | 22.93 | 59.53% |
| Example 09 | 182.55 | 20.69 | 178.53 | 20.24 | 182.84 | 20.73 | 20.55 | 63.73% |
| Example 10 | 194.56 | 22.05 | 201.41 | 22.83 | 199.14 | 22.57 | 22.49 | 60.31% |
| Example 11 | 213.70 | 24.22 | 206.87 | 23.45 | 211.57 | 23.98 | 23.89 | 57.84% |
| Example 12 | 246.78 | 27.97 | 238.19 | 27.00 | 236.17 | 26.77 | 27.25 | 51.91% |
| Example 13 | 236.70 | 26.83 | 239.50 | 27.15 | 231.80 | 26.28 | 26.75 | 52.78% |
| CCSL | 501.40 | 56.84 | 501.70 | 56.87 | 496.40 | 56.27 | 56.66 | 0.00% |

Example 15

Clump Assessment

The clump formation and % clump cohesion of Examples 1-13 was examined according to the procedure below:
1. An 8" diameter sieve with ¾" mesh was stacked on top of a sieve pan and placed on the bottom of a support stand.
2. A trap door assembly was attached to the support stand and positioned ten inches above ¾" sieve.
3. A representative sample of the material described in Example 1 was added to a litter testing pan. The depth of material was three inches.
4, A self leveling 25 ml burette was positioned on a support stand three inches above the litter surface. This setup was used to dispense 25 ml aliquots of liquid to the litter surface—forming a clump in the litter. This process was repeated in a variety of location of the litter pan until the desired number of clumps was created.

Percentage of Cohesion values for many of the Examples of the invention were comparable to that of a conventional clay scooping litter (CCSL).

TABLE 2

| | Clump Cohesion | | |
|---|---|---|---|
| Sample | % Clump Cohesion (15 min) | % Clump Cohesion (24 hr) | # of clumps tested @ each time interval |
| Example 01 | 16.19% | 57.64% | 1 @ 15 min; 6 @ 24 hr |
| Example 02 | 82.13% | 55.15% | 1 @ 15 min; 3 @ 24 hr |
| Example 03 | 65.54% | 88.00% | 10 |
| Example 04 | 98.23% | 97.28% | 10 |
| Example 05 | 98.02% | 96.02% | 10 |
| Example 06 | 97.76% | 95.89% | 10 |
| Example 07 | 89.87% | 95.39% | 10 |

TABLE 2-continued

Clump Cohesion

| Sample | % Clump Cohesion (15 min) | % Clump Cohesion (24 hr) | # of clumps tested @ each time interval |
|---|---|---|---|
| Example 08 | 97.10% | 98.31% | 20 |
| Example 09 | 98.46% | 98.66% | 20 |
| Example 10 | 99.01% | 98.82% | 20 |
| Example 11 | 98.51% | 98.67% | 20 |
| Example 12 | 98.78% | 98.68% | 20 |
| Example 13 | 98.53% | 97.69% | 20 |
| CCSL (Synthetic) | 71.57% | 97.83% | 20 |
| CCSL (Urine) | 93.38% | 96.94% | 20 |

Example 16

Particle Formation

1. Expanded perlite (1.0 lb) was added to a spinning (275 RPM), batch-type agricultural seed coater (Cimbria Heid, Centri Coater CC10).

2. Water was added (0.30 lb) to the liquid addition port on the coater, and the central spinning disc distributed the liquid evenly throughout the perlite aggregate.

3. The water:perlite mix was allowed to spin for approximately (5) seconds.

4. Next, Sodium Bentonite (0.18 lb) was added to the coater.

5. After the Sodium Bentonite addition, the material was allowed to continue to spin for another 5 seconds.

6. The discharge port was then opened on the coater and the material discharged material collected.

7. The coated material was then dried using a lab scale fluid bed dryer (Carrier) to a moisture of approximately 1%.

Example 17

Clump Assessment

1. A one-pint volume of the litter material produced as in Example 1 was transferred to a clear plastic pint jar.

2. A 25 ml self leveling burrett was used to administer 25 ml of a 2% saline solution to the surface of the litter sample.

3. After 15 minutes, the jar was slowly inverted and if a clump was present the clump was removed.

Without departing from the spirit and scope of this invention, one of ordinary skill can make various changes and modifications to the invention to adapt it to various usages and conditions. As such, these changes and modifications are properly, equitably, and intended to be, within the full range of equivalence of the following claims.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed is:

1. A method of manufacturing an animal litter composition comprising: (i) feeding pieces of expanded perlite material having a bulk density in the range of 25-200 kg/m3 into a coater; (ii) adding a liquid to the coater to wet the expanded perlite material; (iii) feeding bentonite having a size range of about 100 mesh to about 300 mesh into the coater to create new integrated granules comprised of expanded perlite having a bentonite exterior; and (iv) drying to a moisture content in the range of 5% to 25%, wherein the expanded perlite material is not extruded.

2. The method of claim 1 further comprising: contacting the granules with water.

3. The method of claim 1 wherein the bentonite is sodium bentonite.

* * * * *